(12) United States Patent
Merchant

(10) Patent No.: US 8,366,137 B1
(45) Date of Patent: Feb. 5, 2013

(54) TOW BAR HAVING LEG LOCK WITH OPPOSING LATCH ELEMENTS

(75) Inventor: David Merchant, Lincoln, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 326 days.

(21) Appl. No.: 12/807,157

(22) Filed: Aug. 30, 2010

(51) Int. Cl.
*B60D 1/54* (2006.01)

(52) U.S. Cl. .......... 280/493; 280/491.1; 280/491.2; 280/491.4

(58) Field of Classification Search .......... 280/493, 280/482, 491.1, 491.4, 492, 494, 491.5; 403/322.4, 403/324; 292/139, 240, 241
See application file for complete search history.

(56) References Cited

U.S. PATENT DOCUMENTS

| | | |
|---|---|---|
| 3,492,022 A | 1/1970 | Hanson |
| 4,861,061 A | 8/1989 | Frantz |
| 5,577,415 A * | 11/1996 | Reasoner .............. 74/502.4 |
| 5,915,715 A | 6/1999 | Ford |
| 5,957,477 A | 9/1999 | Ensz et al. |
| 6,352,278 B1 | 3/2002 | Solberg |
| 6,854,756 B1 | 2/2005 | Solberg |
| 7,029,021 B2 | 4/2006 | Klar |
| 7,461,855 B2 | 12/2008 | Klar |
| 7,942,435 B1 * | 5/2011 | Huston et al. .......... 280/493 |

* cited by examiner

*Primary Examiner* — Tony H. Winner
*Assistant Examiner* — Jacob Knutson
(74) *Attorney, Agent, or Firm* — Donald R. Schoonover

(57) ABSTRACT

A locking mechanism for a tow bar having a leg with telescoping inner and outer members, the locking mechanism including a shuttle device secured to a proximal end of the inner member and having a peripheral groove spaced between a tapered forward end and a tapered rearward end thereof. The locking mechanism also including an aft latching device for locking the tow bar leg in a deployed configuration, and a fore latching device for locking the tow bar leg in a storage configuration. Each fore and aft latching device including a pair of latch elements pivotally and biasingly mounted in a pair of opposing slots of a housing, the slots being superimposed over corresponding openings through the outer member for cooperatively, simultaneously and lockingly interacting with the peripheral groove of the shuttle device.

6 Claims, 3 Drawing Sheets

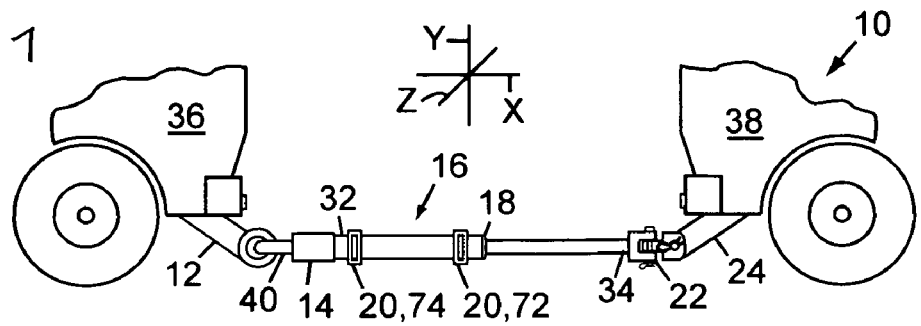
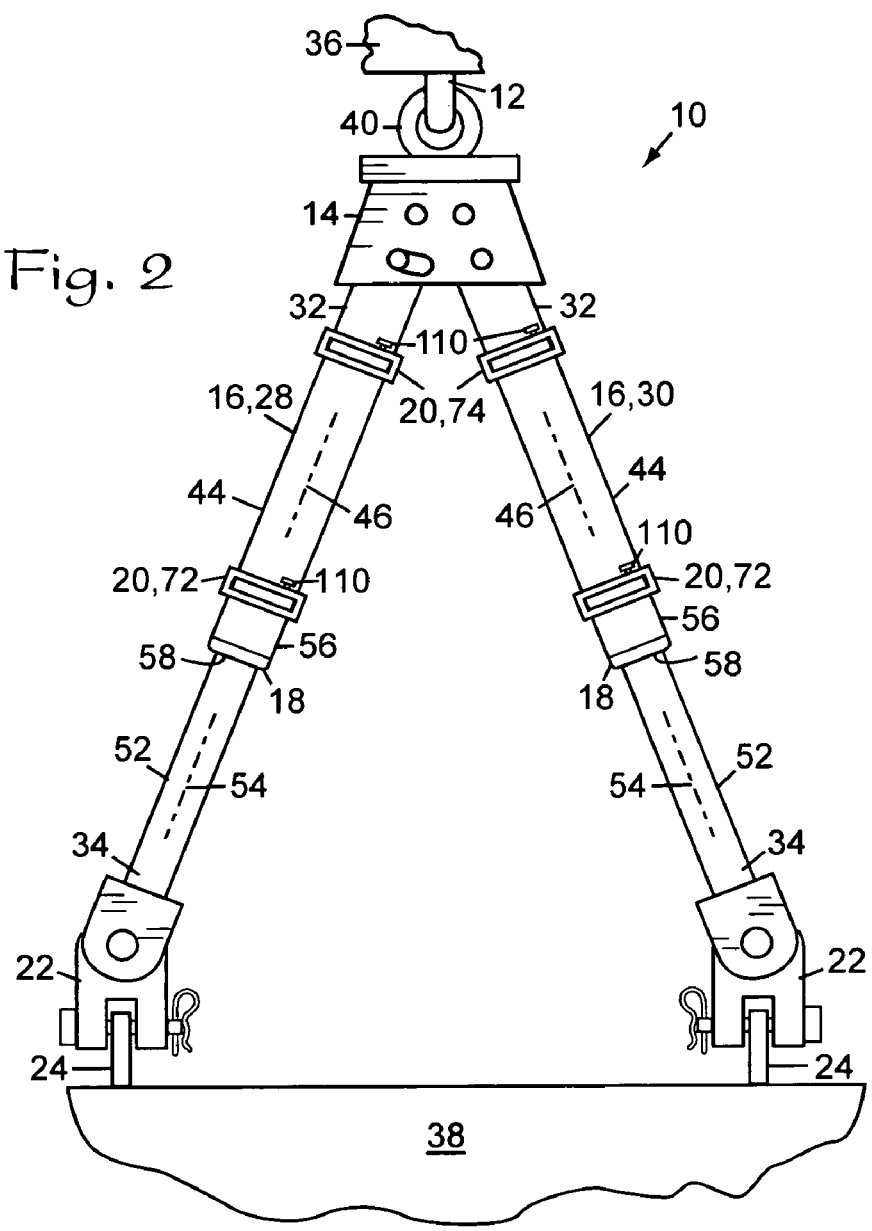

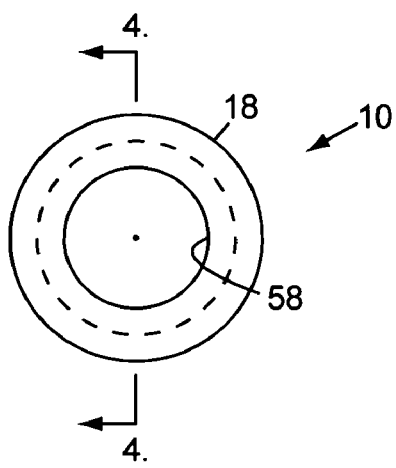
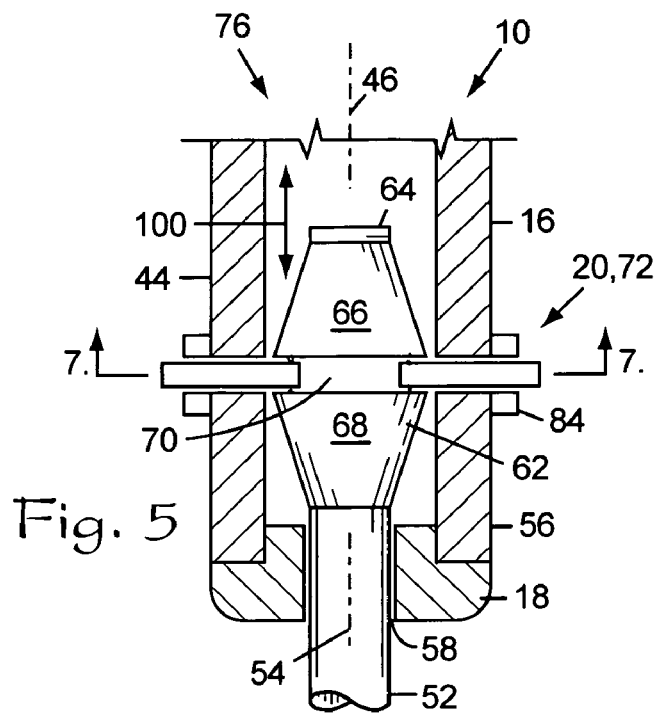
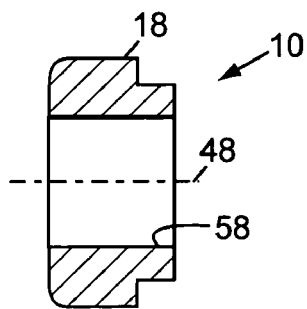
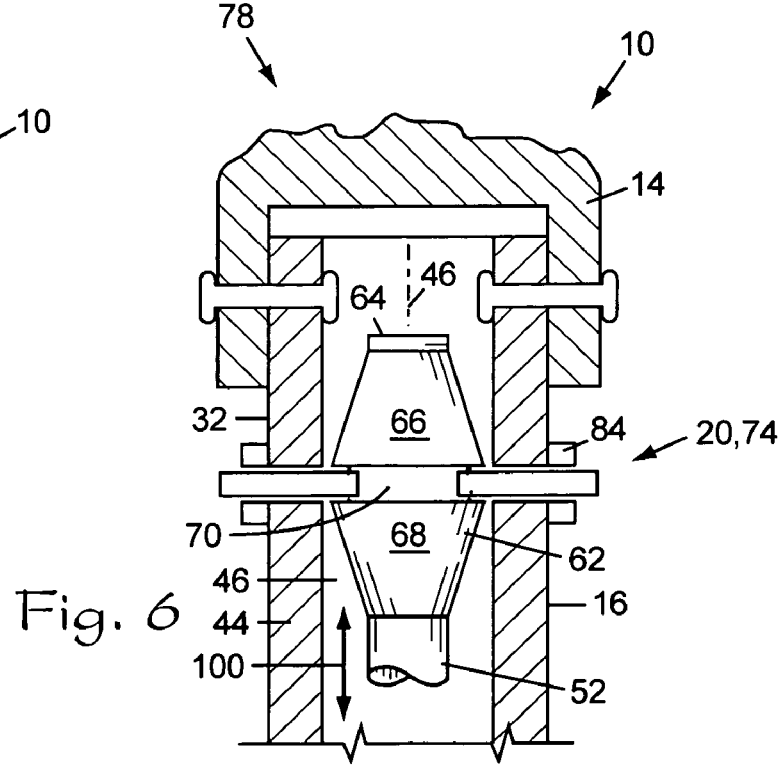

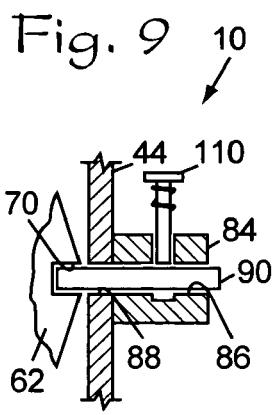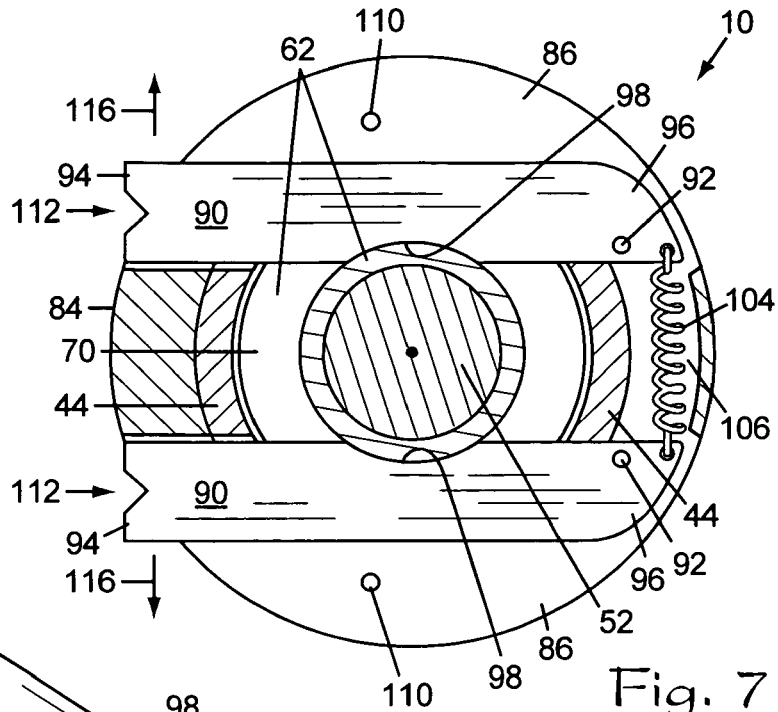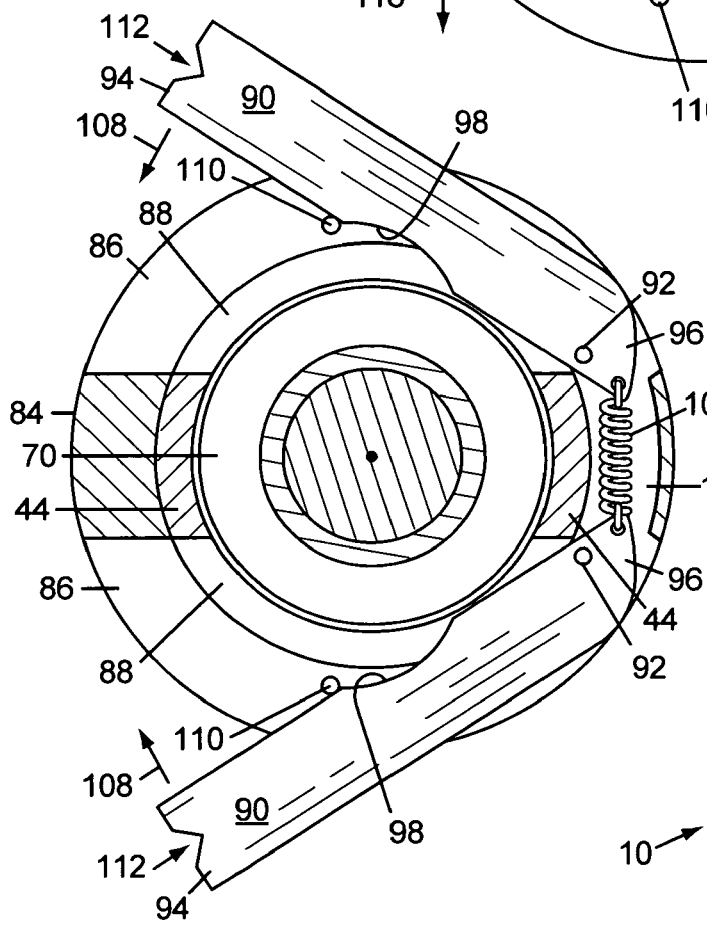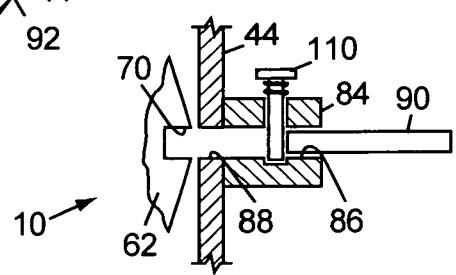

TOW BAR HAVING LEG LOCK WITH OPPOSING LATCH ELEMENTS

BACKGROUND OF THE INVENTION

1. Field of the Invention

The present invention relates to towing accessories and, more particularly without limitation, to tow bars for connecting a trailing or towed vehicle to a towing vehicle.

2. Description of the Related Art

A tow bar is generally used for connecting a hitch arrangement of a vehicle to be towed, sometimes referred to herein as a trailing or towed vehicle, to a hitch arrangement of a towing vehicle. For tow bar applications wherein heavy, massive equipment is being moved a relatively short distance at very low speeds, such as where an airliner is being backed away from a terminal for example, the tow bar may have only one tow bar leg. For such applications, one end of the tow bar leg may be connected to the front end of the vehicle being moved and the other end of the tow bar leg connected to the front end of the moving vehicle so the operator of the towing vehicle can face the vehicle being moved and carefully observe the response of the trailing vehicle as it is being slowly moved by the towing vehicle.

For applications wherein the trailing vehicle is being towed at speeds other than very slow speeds, the tow bar generally has two tow bar legs, the front end of each tow bar leg being pivotally connected to a head of the tow bar. In use, the front ends of the tow bar legs form the apex of an isosceles triangle and the rear ends of the tow bar legs are spaced apart to form the sides of the isosceles triangle. The triangular configuration causes the trailing vehicle to closely track the towing vehicle both along straightaways and around corners.

Tow bars are generally designed to accommodate variations in attitude that inherently occur between the towing and trailing vehicles. One such variation in attitude between the vehicles occurs when the instantaneous elevation of the towing vehicle differs from the instantaneous elevation of the trailing vehicle. A related variation in attitude between the vehicles occurs when the instantaneous ascent/descent orientation of the towing vehicle differs from the instantaneous ascent/descent orientation of the trailing vehicle. Both of these related variations in attitude can be accommodated by tow bar apparatii designed to accommodate relative rotations between the towing and trailing vehicles about a transverse, horizontal axis, commonly referred to as the "pitch" axis, see the "z"-axis in FIG. 1.

Another such variation in attitude between the vehicles occurs when the instantaneous horizontal direction in which the towing vehicle is traveling differs from the instantaneous horizontal direction in which the trailing vehicle is traveling, such as when the trailing vehicle is being pulled around an unbanked corner for example. This situation, commonly referred to as "yaw", can be accommodated by tow bar apparatii designed to accommodate relative rotations between the towing and trailing vehicles about a vertical axis, see the "y"-axis in FIG. 1.

Finally, another such variation in attitude between the vehicles occurs when the instantaneous sidewise tilt of the towing vehicle differs from the instantaneous sidewise tilt of the trailing vehicle, such as the rocking motions which occur when traversing uneven or rough pavement for example. This situation, sometimes referred to as "roll", can be accommodated by tow bar apparatii designed to accommodate relative rotations between the towing and trailing vehicles about a longitudinal, horizontal axis, see the "x"-axis in FIG. 1.

During actual towing operations, all combinations of pitch, yaw and roll are continuously occurring and constantly changing between the towing and trailing vehicles. Prior art is replete with tow bar designs that have been developed in an attempt to accommodate these phenomena, some of those tow bar designs being more successful than others. For example, such designs include ball hitch/ball receiver combinations, conventional receiver hitch/square tube combinations, and pintle hitch/lunette ring combinations.

Most tow bars for towing a vehicle behind another vehicle have two tow bar legs pivotally connected to, and extending rearwardly from, a tow bar head. In order to simplify connection of the tow bar between the towing and trailing vehicles, each of the tow bar legs has an outer member and an inner member wherein the inner member is telescopingly displaceable longitudinally relative to the outer member. After the tow bar legs have been connected between the towing and trailing vehicles, the towing vehicle is slowly eased forwardly relative to the trailing vehicle to thereby extend each inner member outwardly from its respective outer member until the length of each tow bar leg reaches a predetermined length. Each tow bar leg generally has a latch which locks the inner member relative to its outer member at that predetermined length.

Prior art tow bar leg latches are typically mounted on each outer member and include a mechanism that interacts with only one side of the respective inner member. This arrangement may be practical when towing passenger-type, relatively light-weight vehicles. However, when towing massive vehicles, such as military or heavy construction vehicles, lateral forces operatively created in tow bar legs having such one-sided latches tend to cause the legs to bend and buckle, sometimes disastrously, because the legs are unable to endure the stresses arising from the extreme lateral forces which commonly occur when towing such massive vehicles, particularly when decelerating.

What is needed is a locking mechanism for a telescoping leg of a tow bar wherein the locking mechanism simultaneously interacts with opposing sides of the tow bar leg to more symmetrically distribute such extreme, adverse forces and thereby enable the tow bar legs to endure those lateral forces.

SUMMARY OF THE INVENTION

The improvements of the present invention for a locking mechanism for a tow bar for connecting a trailing vehicle to a towing vehicle, the tow bar including at least one leg with an inner member telescopingly displaceable in a hollow outer member, an alignment device, a locking mechanism, and a stop mechanism.

The alignment device, which is secured to the distal end of the outer member, includes an orifice that slidably encircles the inner member to operatively maintain the axis of the inner member in colinear alignment with the axis of the outer member.

The locking mechanism includes a cylindrically-shaped shuttle device, which is secured to the proximal end of the inner member, a tapered forward end, a tapered rearward end, and a peripheral groove spaced between the tapered forward and rearward ends. The locking mechanism also includes an aft latching device mounted to the outer member near the distal end thereof and may optionally include a fore latching device mounted to the outer member near the proximal end thereof.

Each fore and aft latching device includes a housing having a pair of opposing slots superimposed over a pair of corresponding openings through the outer member. Each fore and aft latching device also includes a pair of latch elements wherein each latch element is radially and pivotally mounted in one slot of the pair of opposing slots of the housing. Each latch element has a distal end with a notch and extends outwardly from the housing, and a proximal end. Each latch element also has a shuttle-engaging portion which normally extends into a path of the shuttle device as the inner member is axially displaced in the outer member. Each fore and aft latching device also includes a biasing device connected to the proximal ends of the respective pair of latch elements such that the distal ends of the latch elements are radially biased toward each other and normally into the path of the shuttle device. The biasing device is enclosed in a cavity of the housing.

A stop mechanism corresponding to each latch element of the fore and aft latching device may be activated to prevent the respective latch element from being biased in the path of the respective shuttle device. Each stop mechanism may also be deactivated to thereby allow the respective latch element to be biased into the path of the respective shuttle device.

The locking mechanisms are structured and configured such that, as the inner member is being displaced in the outer member wherein the shuttle-engaging portions of the latch elements of the aft latching device abuttingly engage, slide along and ride over the tapered rearward portion of the shuttle device, and attempt to pass over the peripheral groove, the shuttle-engaging portions are automatically biased into the peripheral groove thereby locking the inner member relative to the outer members in a deployed configuration by way of the pair of latch elements cooperatively and simultaneously interacting with opposing sides of the inner member via the shuttle device. Similarly, as the inner member is being displaced relative to the outer member wherein the shuttle-engaging portions of the latch elements of the fore latching device abuttingly engage and slide over the respective tapered forward portion of the shuttle device and attempt to pass over the peripheral groove, the shuttle-engaging portions are automatically biased into the peripheral groove thereby locking the inner member relative to the outer member in a storage configuration.

PRINCIPAL OBJECTS AND ADVANTAGES OF THE INVENTION

The principal objects and advantages of the present invention include: providing a locking mechanism for a telescoping leg of a tow bar wherein the locking mechanism simultaneously interacts with opposing sides of the tow bar leg; providing such a locking mechanism for a tow bar wherein the tow bar legs are separately extendable and retractable as needed to separately accommodate the difference in span of the tow bar legs when connecting the tow bar legs to a trailing vehicle; providing such a locking mechanism for a tow bar wherein, after connecting the tow bar between a towing and a trailing vehicle, the locking mechanism automatically locks the tow bar legs to thereby provide a predetermined spacing between the towing and trailing vehicles; providing such a locking mechanism which automatically locks the tow bar in a self-storing configuration; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

BRIEF DESCRIPTION OF THE DRAWING FIGURES

FIG. 1 is a side elevational view of a tow bar having a tow bar leg lock with opposing latch elements in accordance with the present invention.

FIG. 2 is an enlarged top plan view of the tow bar.

FIG. 3 is an enlarged plan view of an alignment device of the tow bar.

FIG. 4 is a cross-sectional view of the alignment device of the tow bar shown in FIG. 3, taken along line 4-4 thereof.

FIG. 5 is an enlarged and fragmentary, partially cross-sectional view of a locking mechanism showing a tow bar leg of the tow bar in a deployed configuration.

FIG. 6 is an enlarged and fragmentary, partially cross-sectional view of a locking mechanism showing a tow bar leg of the tow bar in a storage configuration.

FIG. 7 is a further enlarged, partially cross-sectional and schematic view taken along line 7-7 of FIG. 5, showing the locking mechanism in a locked configuration.

FIG. 8 is a further enlarged, partially cross-sectional and schematic view similar to FIG. 7, but showing the locking mechanism in an unlocked configuration.

FIG. 9 is a schematic representation of a stop mechanism of the tow bar in an activated state.

FIG. 10 is a schematic representation similar to FIG. 9 but showing stop mechanism in a deactivated state in accordance with the present invention.

DETAILED DESCRIPTION OF THE INVENTION

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow bar having a tow bar leg lock in accordance with the present invention, as shown in FIGS. 1 through 10. The tow bar 10 includes a towing hitch member 12, a head member 14, at least one tow bar leg 16, an alignment device 18, at least one locking mechanism 20, tow bar leg connectors 22, and a trailing hitch member 24.

The following description of the present invention is directed to applications of the present invention for a tow bar 10 having a pair of tow bar legs 16, also designated herein by numerals 28, 30 wherein each tow bar leg has a proximal end 32 pivotally connected to the head member 14, and a rearwardly-extending distal end 34. Applications of the present invention 10 to tow bars having only one tow bar leg 16 will be obvious to persons skilled in the tow bar art based on the present disclosure.

The towing hitch member 12 of the present invention 10 is secured to the rear end of a towing vehicle 36 and generally includes a conventional receiver hitch, a hitch ball, a pintle hitch, or other suitable hitch arrangement. The trailing hitch member 24 is secured to a towed or trailing vehicle 38.

The head member 14 includes a forwardly-extending connector 40 for appropriately and releasably coupling with the towing hitch member 12, such as a square tube for a conventional receiver hitch, a hitch ball receiver, a lunette ring, or other appropriate connector 40.

Each tow bar leg 28, 30 includes a hollow outer member 44, a first axis 46, an inner member 52 with a second axis 54, and the alignment device 18 secured to distal ends 56 of the outer members 44. Each alignment device 18 includes an orifice 58, which slidably encircles the respective inner member 52 to thereby operatively maintain the second axis 54 of the inner member 52 in colinear alignment with the first axis 46 of the outer member 44, as shown in FIGS. 2 and 5.

The alignment devices 18 also prevent the inner members 52 from being inadvertently pulled out of their respective outer members 44.

Each tow bar leg 28, 30 includes at least one of the locking mechanisms 20, Each locking mechanism 20 includes a cylindrically-shaped shuttle device 62 secured to and encircling the inner member 52 near a proximal end 64 thereof. Each shuttle device 62 has a tapered forward end 66, a tapered rearward end 68, and a peripheral groove 70 spaced forwardly of the tapered rearward end 68 and between the tapered forward and rearward ends 66, 68, as shown in FIGS. 5 and 6. The shuttle device 62 is dimensioned wherein the inner member 52 with the shuttle device 62 secured thereto is slidably displaceable, longitudinally and telescopingly, in the outer member 44 along the first axis 46.

Each locking mechanism 20 also includes an aft latching device 72 secured to each outer member 44 near the distal end 56 thereof as shown in FIG. 5, and may also include a fore latching device 74 secured to each outer member 44 near the proximal end 32 as shown in FIG. 6. Each aft latching device in conjunction with a respective shuttle device 62 is structured and positioned to releasably lock the respective tow bar leg 28, 30 in a deployed configuration 76 as shown in FIG. 5 and as hereinafter described. Also, each fore latching device 74 in conjunction with a respective shuttle device 62 is structured and positioned to releasably lock the respective tow bar leg 28, 30 in a storage configuration 78 as shown in FIG. 6 and as hereinafter described.

Each aft and fore latching device 72, 74 includes a housing 84 having a pair of opposing slots 86, the housing 84 being mounted to the outer member 44 wherein the slots 86 are superimposed over a pair of corresponding openings 88 through the outer member 44.

Each aft and fore latching device 72, 74 also includes a pair of opposing latch elements 90. Each latch element 90 is mounted to pivot about an axle 92 in a respective slot of the pair of slots 86 of the housing 84 and has a distal end 94 which extends outwardly from the housing 84, a proximal end 96, and a shuttle-engaging portion 98. Each latch element 90 is pivotally mounted to the housing 82 wherein the shuttle-engaging portion 98 of the latch element 90 is radially displaceable into a path 100, see FIGS. 5 and 6, of the respective shuttle device 62 as the inner member 52 with the shuttle device 52 secured thereto are axially displaced along the first axis 46 of the respective outer member 44.

It is to be understood that the shuttle-engaging portions 98 may be linear with the proximal and distal ends 94, 96 of the respective latch element 90 if desired, instead of arcuately conforming to the shuttle device 62 as shown.

Each aft and fore latching device 72, 74 further includes a biasing mechanism 104, such as a compression spring 104 enclosed in a cavity 106 of the housing 84, for example, or other suitable biasing arrangement, the biasing mechanism 104 being connected to the proximal ends 96 of the respective pair of latch elements 90 to operatively bias the distal ends 94 of the latch elements 90 radially toward each other, as indicated by the arrows designated by numeral 108 in FIG. 8.

Preferably, the peripheral grooves 70 completely surround the shuttle devices 62 so each inner member 52 with its attached shuttle device 62 can be rotated about the second axis 54 so as to simplify connecting the tow bar legs 28, 30 to the trailing hitch member 22, for example. For some applications, however, it may be desirable that only selected portions of the peripheral grooves 70 be formed around the shuttle device 62. In that event, opposing selected portions of the peripheral groove 70 are formed in the shuttle device 62 wherein those opposing selected portions are positioned to receive the opposing shuttle-engaging portions 98 of the latch elements 90 of the aft and fore latching devices 72, 74 as described herein.

A stop mechanism 110, corresponding to each of the latch elements 90, is mounted on the housing 84. Each stop mechanism 110 is structured such that when the shuttle-engaging portion 98 of the respective latch element 90 is withdrawn from the path 100 of the shuttle device 64, the stop mechanism 110 can be selectively activated to interfere with the respective latch element 90, as schematically shown in FIG. 9, and prevent the biasing mechanism 104 from biasing the shuttle-engaging portion 98 of that latch element 90 back into path 100 of the shuttle device 62. Each stop mechanism 110 can be selectively deactivated, as schematically shown in FIG. 10, to thereby allow the shuttle-engaging portion 98 of the respective latch element 90 to again radially extend into the path 100 of the shuttle device 64. Various mechanisms are known to those skilled in the relevant art which would provide the described function of the stop mechanism 110.

It is to be understood that various components of the stop mechanisms 110 may have a square profile or any other profile, if desired, instead of being circular as shown.

Each latch element 90 may include a grip 112, such as a notch 112 or other suitable feature for example, in the distal end 94 thereof to assist a user in manually displacing the latch element 90 radially outwardly relative to the outer member 44, as indicated by the arrows designated by numeral 116 in FIG. 7 wherein the respective stop mechanism 110 can be activated to thereby selectively prevent the biasing mechanism 104 from biasing the respective latch element 90 back into the path 100, as shown in FIG. 8.

If desired, a fore latching device 74 may be mounted near the proximal end 32 of each tow bar leg 28, 30 wherein the inner members 52 of the tow bar legs 28, 30 can be retained in the respective outer member 44 in the storage configuration 78 for compactness and storage purposes as shown in FIG. 6 and as hereinafter described.

The following is a description of the basic function of each locking mechanism 20. As the inner member 52 of a tow bar leg 28, or 30, is being longitudinally displaced relative to its respective outer member 44 wherein the tapered forward end 66 or tapered rearward end 68 of the shuttle device 62 abuttingly engages the shuttle-engaging portions 98 of the latch elements 90, the latch elements 90 are displaced radially outwardly relative to the first axis 46 as the latch elements 90 slide along and ride over the tapered forward end 66, or tapered rearward end 68. Then, as the shuttle-engaging portions 98 attempt to pass over the peripheral groove 70 of the shuttle device 62, the biasing mechanism 104 of the aft latching device 72, or fore latching device 74, automatically biases the latch elements 90 into the peripheral groove 70 of the shuttle device 62, thereby locking the tow bar leg 28, or 30, in a locked, deployed configuration 76 or storage configuration 78 as shown in FIG. 7, wherein the inner member 52 is no longer displaceable relative to the outer member 44 of the tow bar leg 28, or 30 by means of the opposing pair of latch elements 90 cooperatively and simultaneously interacting with opposing sides of the inner member 52 via the shuttle device 62.

Subsequently, the latch elements 90 can be lifted out of the peripheral groove 70 by manually overcoming the biasing action of the biasing mechanism 104 as indicated by arrows 116 in FIG. 7. After the latch elements 90 have been lifted out of the peripheral groove 70, the inner member 52 and the attached shuttle device 64 can then be displaced longitudinally relative to the outer member 44 so the latch elements 90 are no longer aligned with the peripheral groove 70. The tow bar leg 28, or 30, is then in an unlocked configuration wherein the inner member 52 can continue to be longitudinally displaced relative to the outer member 44 so long as the latch elements 90 do not become realigned with, and biased into, the peripheral groove 70 of the shuttle device 62.

In an application of the present invention, the rear end of the towing vehicle 36 is positioned near the front end of the trailing vehicle 38. Since it is difficult, if not impossible, to perfectly align the towing vehicle 36 with, and perfectly space the towing vehicle 36 from, the trailing vehicle 38 for connection purposes, the tow bar legs 28, 30 of the present invention are structured to simplify connecting the trailing vehicle 38 to the towing vehicle 36. After connecting the tow bar 10 to the towing vehicle 36 and with the shuttle devices 62 spaced forwardly from the respective aft latching devices 72, each inner member 52 is manually extended outwardly from its outer member 44 as necessary wherein the tow bar leg connectors 22 can be connected to the trailing hitch member 24 of the trailing vehicle 38.

After connecting each of the tow bar legs 28, 30 to the trailing hitch member 24, the towing vehicle 36 is slowly eased forwardly relative to the trailing vehicle 38 causing the outer members 44 and the aft latching devices 72 attached thereto to be displaced forwardly relative to the respective shuttle devices 62 until the latch elements 90 of the aft latching devices 72 abuttingly engage the tapered rearward ends 68 of the shuttle devices 62, displacing the latch elements 90 of the aft latching devices 72 radially outwardly relative to the first axis 46. As the latch elements 90 of the aft latching device 74 slide along and ride over the tapered rearward ends 68 of the shuttle devices 62 and attempt to pass over the peripheral grooves 70 of the shuttle devices 62, the biasing mechanisms 104 of the aft latching devices 72 automatically bias the latch elements 90 of the aft latching devices 73 into the peripheral grooves 70 of the shuttle devices 62 thereby locking the tow bar legs 28, 30 in the deployed configuration 76, as shown in FIG. 5. With both of the tow bar legs 28, 30 locked in the deployed configuration 76, the trailing vehicle 38 is then properly aligned with, and spaced at a predetermined towing distance from, the towing vehicle 36.

If each of the tow bar legs 28, 30 also includes a fore latching device 74, after the tow bar has been disconnected from the towing and trailing vehicles and with the shuttle devices 62 spaced between the aft and fore latching devices 72, 74, the inner members 52 of the tow bar legs 28, 30 can be longitudinally and telescopingly displaced in their respective outer members 44 toward the head member 14 causing the tapered forward ends 66 of the shuttle devices 62 to abuttingly engage the latch elements 90 of the fore latching devices 74, displacing them radially outwardly relative to the first axis 44. Then, as the latch elements 90 of the fore latching devices 74 attempt to pass over the peripheral grooves 70 of the shuttle devices 62, the biasing mechanisms 104 of the fore latching devices 74 automatically bias the latch elements 90 into the peripheral grooves 70 of the shuttle devices 62, locking the tow bar leg 28, 30 in the storage configuration 78, as shown in FIG. 6, wherein the inner members 52 can no longer be displaced relative to the outer members 44 until subsequently released.

It should be noted that, besides the cooperative and simultaneous interaction of the latch elements with opposing sides of the inner members 52, the presence of the shuttle devices 62 encircling the inner members 52 reinforces and further enables the tow bar legs to endure the adverse lateral forces generated therein when towing massive equipment such as heavy equipment and military vehicles.

It is to be understood that while certain forms of the present invention have been illustrated and described herein, it is not to be limited to the specific forms or arrangement of parts as described and shown.

What is claimed and desired to be covered by Letters Patent is as follows:

1. In a tow bar having a tow bar leg with an inner member telescopingly displaceable in an outer member, the improvement comprising: a locking mechanism having
    (a) a shuttle device secured to a proximal end of the inner member, the shuttle device having a tapered rearward end, a tapered forward end, and a peripheral groove;
    (b) a pair of openings through the outer member;
    (c) a housing mounted on the outer member and having a pair of opposing slots superimposed over the pair of openings through the outer member; and
    (d) a pair of latch elements, each latch element having a shuttle-engaging portion and being pivotally and biasingly mounted in a respective one of the opposing slots of the housing;
    (c) wherein, as the peripheral groove of the shuttle device is disposed adjacent to the pair of openings through the outer member, the shuttle-engaging portions of the pair of latch elements are automatically biased into the peripheral groove thereby locking the inner member relative to the outer member by the pair of latch elements cooperatively interacting with opposing sides of the inner member via the shuttle device.

2. A locking mechanism for a tow bar leg having an inner member telescopingly and slidably displaceable in an outer member, the locking mechanism comprising:
    (a) a shuttle device secured to a proximal end of the inner member of the tow bar leg, the shuttle device including a tapered rearward end, a tapered forward end, and a peripheral groove spaced between the tapered rearward and forward ends, the shuttle device being slidably displaceable within the outer member of the tow bar leg;
    (b) an aft latching device mounted to the outer member near a distal end thereof, the aft latching device including:
        (1) a housing having a pair of opposing slots therethrough, the opposing slots being superimposed over a pair of corresponding openings through the outer member,
        (2) a latch element of a pair of latch elements pivotally mounted in each slot of the pair of opposing slots of the housing, each latch element having a proximal end, a distal end extending outwardly from the housing, and a shuttle-engaging portion which normally extends into a path of the shuttle device as the inner member is axially displaced in the outer member, and
        (3) a biasing device connected to the proximal ends of the latch elements wherein the distal ends of the latch elements are radially biased toward each other and into the path of the shuttle device;
    (c) wherein, as the inner member is being displaced in the outer member and the shuttle-engaging portions of the latch elements abuttingly engage the tapered forward or rearward end of the shuttle device, the latch elements slide along and ride over the tapered forward or rearward end and, as the shuttle-engaging portions of the latch elements attempt to pass over the peripheral groove of the shuttle device, the shuttle-engaging portions of the latch elements are automatically biased into the peripheral groove thereby locking the inner member relative to the outer member thereby preventing further displacement of the inner member relative to the outer member by cooperative and simultaneous interaction of the pair of latch elements with opposing sides of the inner member via the shuttle device.

3. A locking mechanism for a tow bar leg as described in claim 2, wherein the distal ends of the pair of latch elements include a grip.

4. A locking mechanism for a tow bar leg as described in claim 3, wherein the grip includes a notch.

5. A locking mechanism for a tow bar leg as described in claim 2, further comprising the housing having a cavity with the biasing device enclosed therein.

6. A locking mechanism for a tow bar leg as described in claim 2, wherein the biasing device includes a compression spring.

* * * * *